(No Model.)
C. N. FENNER.
BALANCE.
No. 541,434. Patented June 18, 1895.
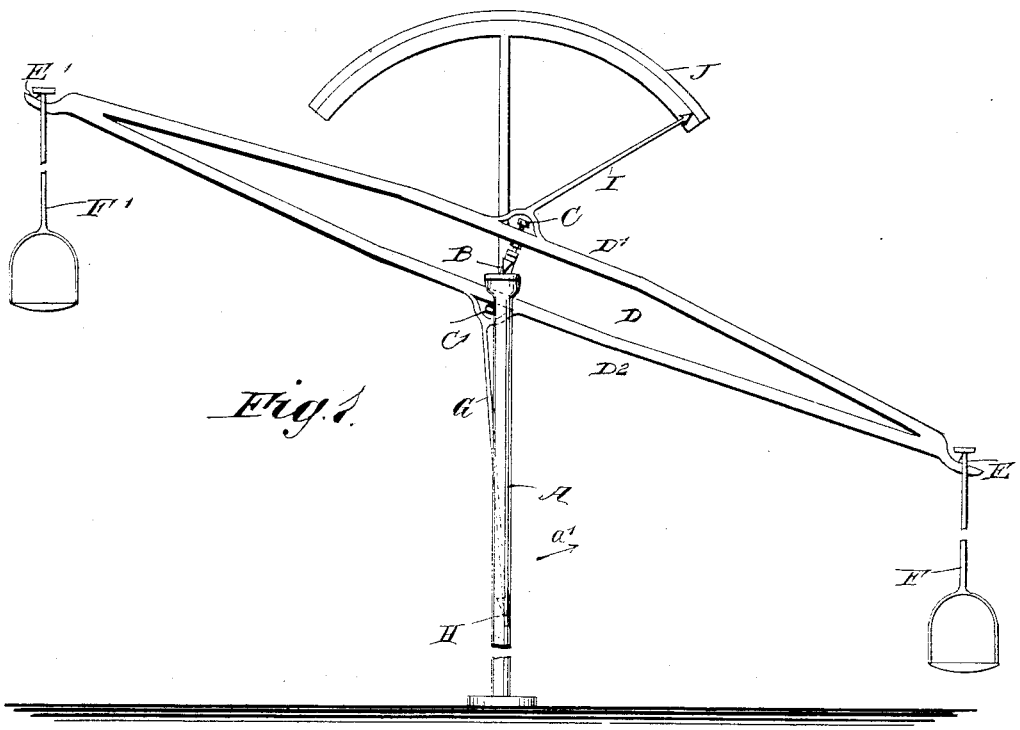
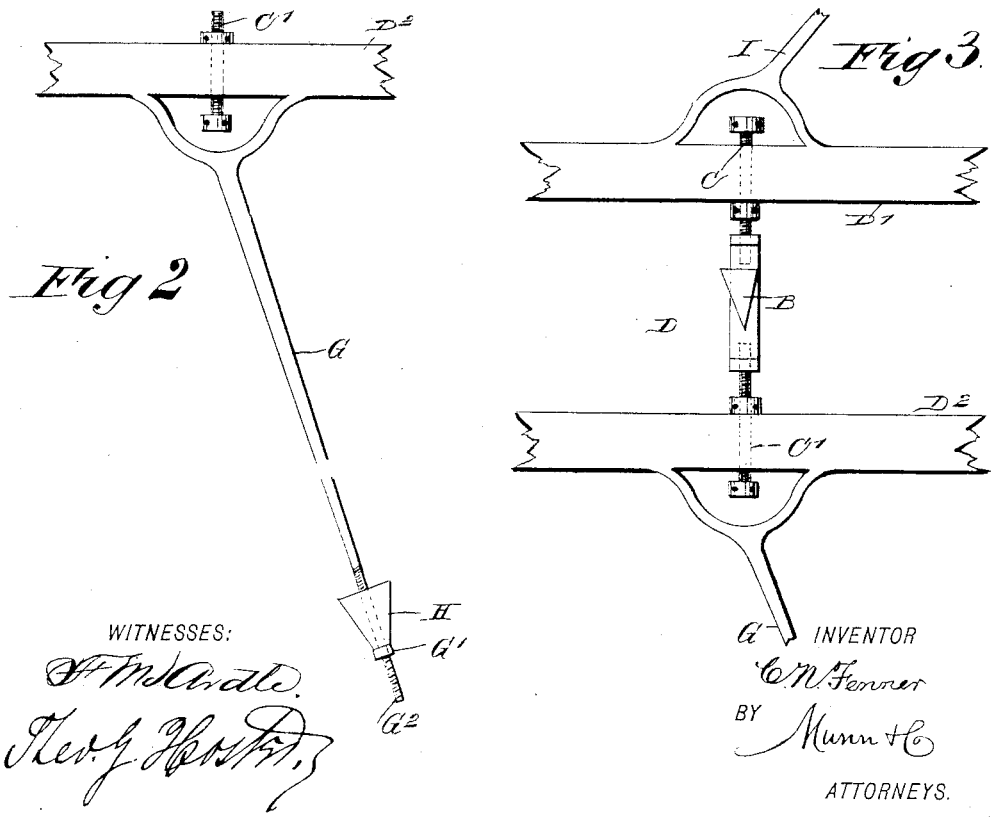
WITNESSES:
INVENTOR
C. N. Fenner
BY Munn & Co.
ATTORNEYS.

UNITED STATES PATENT OFFICE.

CLARENCE N. FENNER, OF PATERSON, NEW JERSEY.

BALANCE.

SPECIFICATION forming part of Letters Patent No. 541,434, dated June 18, 1895.

Application filed July 12, 1894. Serial No. 517,354. (No model.)

*To all whom it may concern:*

Be it known that I, CLARENCE N. FENNER, of Paterson, in the county of Passaic and State of New Jersey, have invented a new and Improved Balance, of which the following is a full, clear, and exact description.

The object of the invention is to provide a new and improved balance, which is comparatively simple and durable in construction and arranged for quickly obtaining accurate results in a very simple manner; the balance being designed for use on all classes of balances, from the most delicate chemical and physical balances, to large scales for weighing merchandise, coal, &c.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an enlarged side elevation of the suspended weight, and Fig. 3 is an enlarged side elevation of the beam-fulcrum.

The improved balance is provided with a suitable standard A engaged at its upper end by the knife-edge B, held adjustable on set screws C and C' screwing in the arms D' and $D^2$ respectively, of the beam D. The latter is provided on its outer ends with the knife-edges E and E', carrying the scale pans F and F' respectively.

From the under side of the arm $D^2$ of the beam D, extends downwardly and in an inclined direction relative to the center line passing from one knife-edge E, to the other knife-edge E', the arm G which carries at its lower end a weight H held adjustable on the threaded end $G^2$ of the said arm G, by means of a nut G', as plainly illustrated in Fig. 2. From the upper arm D' of the beam D extends in an angular direction a rigid pointer I, indicating on a graduated segment J, supported on the standard A. It will be seen that when the balance is in its normal position, as illustrated in Fig. 1, then the weight H will hold the beam D in an inclined position with the pointer I at zero on the graduated segment J. Now an article to be weighed is placed in the pan F'. Then the latter sinks downward and imparts a swinging motion to the beam D, so that the arm G with the weight H swings in the direction of the arrow $a'$, until the weight H counterbalances the article placed in the pan F'. At the same time the pointer I moves on the graduated segment J, and when the beam is at rest, as above described, then the said pointer indicates the weight of the article on the graduation of the segment J. Instead of the weight H being used to balance the entire weight of the article in the scale pan F', I may use the suspended weight H only for indicating fractions of the unit of weight, it being understood that the several parts are balanced by ordinary weights placed in the scale pan F. In order to do this properly, a given weight in the scale pan F' must be balanced by a given weight in the pan F in all the positions of the beam D. The slight increase of the weight in the pan F' is counterbalanced by the swinging of the weight H in the direction of the arrow $a'$. In the ordinary construction of balances, this would not be the case, as their beams have only one position of equilibrium, but by having the knife-edge B adjustable, I am enabled to readily place the three knife-edges E, B, and E' in alignment. When the beam is thus adjusted the given weight in the left pan F', will be balanced by a like weight in the pan F, in any position the beam may assume, while a small addition of weight in the pan F', will be counterpoised by the rising of the weight H.

Having thus fully described my invention, I claim as new and desire to secure by Letters Patent—

1. A balance comprising the standard having the graduated segment over its upper end, the scale beam having the vertical longitudinally aligned set screws provided between their inner ends with the middle knife edge engaging the upper end of the standard and said beam also provided with knife edges at its ends, the pans F F suspended from the end knife edges, the weighted arm G extending down from the center of gravity and inclined toward one end of the beam, and a similarly inclined pointer I above the center of gravity and working over said segment, substantially as described.

2. A scale beam provided in its upper and lower sides respectively with vertical set screws adjustable toward and from each other at their inner ends, and a knife edge in the space between the upper and lower sides of the beam and engaged by the inner ends of the set screws to be raised and lowered thereby, substantially as shown and described.

CLARENCE N. FENNER.

Witnesses:
NORMAN M. ESTEY,
WILL W. OFFICER.